United States Patent [19]

Nadeau

[11] Patent Number: 5,302,245
[45] Date of Patent: Apr. 12, 1994

[54] INTEGRATED WASTEPAPER TREATMENT PROCESS

[75] Inventor: Allan Nadeau, Kennebonk, Me.

[73] Assignee: VPS Technology Partnership, Boston, Mass.

[21] Appl. No.: 679,330

[22] Filed: Apr. 2, 1991

[51] Int. Cl.$^5$ .............................................. D21C 5/02
[52] U.S. Cl. ............................................ 162/8; 162/4; 162/55
[58] Field of Search ............... 162/4, 5, 6, 7, 8, 55, 162/60, 56, 78, 64, 72, 80, 83, 84, 90; 209/221.2, 170; 210/703

[56] References Cited

U.S. PATENT DOCUMENTS

| | | | |
|---|---|---|---|
| 955,898 | 4/1910 | Petsche | 162/8 |
| 3,055,792 | 9/1962 | Koeppen et al | 162/64 |
| 3,994,770 | 11/1976 | Lausch | 162/5 |
| 4,029,543 | 6/1977 | Lindahl | 162/78 |
| 4,194,968 | 3/1980 | Pfalzer et al. | 162/4 |
| 4,277,328 | 7/1981 | Pfalzer et al. | 209/169 |
| 4,332,638 | 6/1982 | Mauer et al | 162/4 |
| 4,343,679 | 8/1982 | DeCeuster et al. | 162/4 |
| 4,368,101 | 1/1983 | Bahr | 162/4 |
| 4,390,395 | 6/1983 | De Ceuster et al. | 162/6 |
| 4,465,591 | 8/1984 | Holz et al. | 209/3 |
| 4,483,741 | 11/1984 | Maloney et al. | 162/5 |
| 4,483,742 | 11/1984 | Bridle | 162/5 |
| 4,548,673 | 10/1985 | Nanda et al. | 162/4 |
| 4,548,674 | 10/1985 | Hageman et al. | 162/5 |
| 4,561,933 | 12/1985 | Wood et al. | 162/5 |
| 4,586,982 | 5/1986 | Poppel et al. | 162/5 |
| 4,599,190 | 7/1986 | Maloney | 252/174.24 |
| 4,618,400 | 10/1986 | Wood et al. | 162/5 |
| 4,619,761 | 10/1986 | Franzen | 162/55 |
| 4,643,800 | 2/1987 | Maloney et al. | 162/5 |
| 4,749,473 | 6/1988 | Shioiri et al. | 209/164 |
| 4,780,179 | 10/1988 | Clement | 162/5 |
| 4,786,364 | 11/1988 | Tefft | 162/5 |
| 4,915,785 | 4/1990 | Siminoski et al. | 162/78 |
| 4,915,821 | 4/1990 | Lamort | 162/55 |
| 4,938,842 | 7/1990 | Whiting et al. | 162/80 |

FOREIGN PATENT DOCUMENTS

| | | | |
|---|---|---|---|
| 2495655 | 6/1982 | France | 162/78 |
| 1012527 | 12/1965 | United Kingdom | 162/7 |

OTHER PUBLICATIONS

Pulp and Paper Manufacture, Second Edition, vol. II (1969) McGraw-Hill Book Co., New York, N.Y. pp. 125-127.

Primary Examiner—W. Gary Jones
Assistant Examiner—Brenda Lamb
Attorney, Agent, or Firm—Hedman, Gibson & Costigan

[57] ABSTRACT

A novel process for the treatment of wastepaper which provides for enhanced removal of both ink particles and non-ink contaminants is disclosed.

21 Claims, 2 Drawing Sheets

INTEGRATED WASTEPAPER TREATMENT PROCESS

The present invention relates to a process for the treatment of wastepaper. More particularly, the present invention relates to a process for deinking wastepaper. Most particularly, the present invention relates to a process for enhanced removal of ink particles and non-ink contaminants from wastepaper.

BACKGROUND OF THE INVENTION

In modern times, with the ecological concerns about conservation of raw materials and the rapid decline of available landfill space, it has become increasingly desirable to recover and recycle used raw materials. Thus, recovered wastepaper represents a valuable source of raw material for the paper industry. In order for the wastepaper to be regenerated into a viable starting material and to produce a commercially acceptable paper, the wastepaper must be treated to remove any ink particles and non-ink contaminants.

Many prior art processes are known for deinking wastepaper, many of which are directed to the developpment of deinking agents. Poppel et al., U.S. Pat. No. 4,586,982 describe a process comprising treating the wastepaper in a pulper at an alkaline pH with alkali silicate, an oxidatively active bleaching agent, an acid selected from the group consisting of fatty acids and resinic acids containing more than 10 carbon atoms and a dispersing agent wherein the acid and dispersing agent are employed together in an oil-in-water emulsion. Other disclosures of deinking agents are set forth in, for example, Wood et al., U.S. Pat. No. 4,618,400 (thiol ethoxylate compounds); Wood et al., U.S. Pat. No. 4,561,933 (a mixture of $C_8$ to $C_{16}$ alkanols and alcohol ethoxylates); DeCeuster et al., U.S. Pat. No. 4,343,679 (compounds capable of liberating ions with a positive charge equal or greater than 2); Bridle, U.S. Pat. No. 4,483,742 (pine oil and a soap-making fatty acid); and Tefft, U.S. Pat. No. 4,786,364 (a hydrolyzed copolymer of dimethyldiallyl ammonium chloride and acrylamide).

Other prior art processes are directed to improvements in either washing or flotation methods of separating ink particles from wastepaper fibers.

Nanda et al., U.S. Pat. No. 4,548,673 describe a deinking flotation method comprising the steps of independently introducing air into a fiber stock slurry, mixing the air bubbles and slurry, and separating the ink-laden air bubbles from the fiber slurry, where each of these steps is independently controlled. Shiori et al., U.S. Pat. No. 4,749,473, describe introducing air bubbles into the wastepaper pulp slurry through a number of orifices formed on a peripheral surface of at least one rotatable horizontal cylinder located in the bottom portion of a flotation vessel. Pfalzer et al., U.S. Pat. No. 4,277,328, describe employing an impeller at the bottom of a flotation apparatus for dispersing air into the wastepaper pulp slurry.

None of these processes however are directed to providing a method which facilitates both removal of ink particles and enhanced removal of non-ink contaminants. The presence of non-ink contaminants is a recurring problem in the recycling of wastepaper. These contaminants have in most cases been added intentionally during the actual manufacture of the paper in order to give the fibrous structures special additional properties, or during processing of the paper. The contaminants may be polymeric and are of various types such as polyvinyl acetates, vinyl acetate/ethylene coplymers, waxes, styrene/butadiene latices, polystyrene, hydrocarbon resins, polyisoprenes, resin esters, butyl rubber or polyamides. They end up in specific products such as sealing tapes, adhesives used for bookbinding, coated cardboard, contact adhesives, envelopes and adhesives for gluing cardboard.

The polymeric contaminants, especially glues or adhesives, are especially troublesome. They form agglomerates which deposit in the installations for regenerating wastepaper and in the machines for manufacturing paper or cardboard. Moreover, these agglomerates detract from the final appearance of the sheet of paper or cardboard and they cause tearing when the paper is used as printing paper, in particular in rotary printing machines.

Maloney et al., U.S. Pat. No. 4,643,800 teaches blending contaminated secondary fiber with water, a substituted oxyethylene glycol surfactant and a dispersant and coincidently heating the blend to a temperature above the melting point of the contaminant to be dispersed and removed. Other disclosures of high temperature decontamination include Maloney et al., U.S. Pat. No. 4,483,741 and Maloney, U.S. Pat. No. 4,599,190.

Hageman et al., U.S. Pat. No. 4,548,674 disclose decontaminating wastepaper fibers by pulping the wastepaper in an acidic aqueous solution (pH=2.5 to 6.5) containing at least one peroxide compound selected from among organic and inorganic peracids.

Clement, U.S. Pat. No. 4,780,179 discloses a decontamination method comprising a cold temperature low mechanical energy pulping step, followed by screening, thickening and high temperature high shear washing steps to aid in removal of non-ink contaminants. The Clement patent however suffers from the need of requiring separate steps of non-ink contaminant removal, ink softening and ink particle detachment, each step requiring a specific set of parameters and thus describing an expensive and difficult to accurately control process.

Thus, there remains a long felt need in the art to provide a simple and easy to control wastepaper treatment process whereby there is obtained enhanced removal of both ink particles and non-ink contaminants.

SUMMARY OF THE INVENTION

To this end, an object of the present invention is to provide a process for the treatment of wastepaper.

A further object of the present invention is to provide a wastepaper treatment process which provides for the enhanced removal of both ink particles and non-ink contaminants.

Surprisingly, applicant has found that by employing a low temperature pulping step followed by a low temperature deinking step there is obtained a wastepaper treatment process which is easy to control and provides for enhanced removal of both ink particles and non-ink contaminants.

DETAILED DESCRIPTION OF THE INVENTION

As used throughout the specification, the term "consistency" refers to the weight percent of fibrous material solids content in an aqueous suspension.

In its broadest aspect, the present invention provides a process comprising six stages for the recycling of wastepaper to produce a pulp possessing sufficient brightness and being sufficiently free from dirt count and non-ink contaminants to satisfy industry requirements as a pulp substitute.

Figure 1:
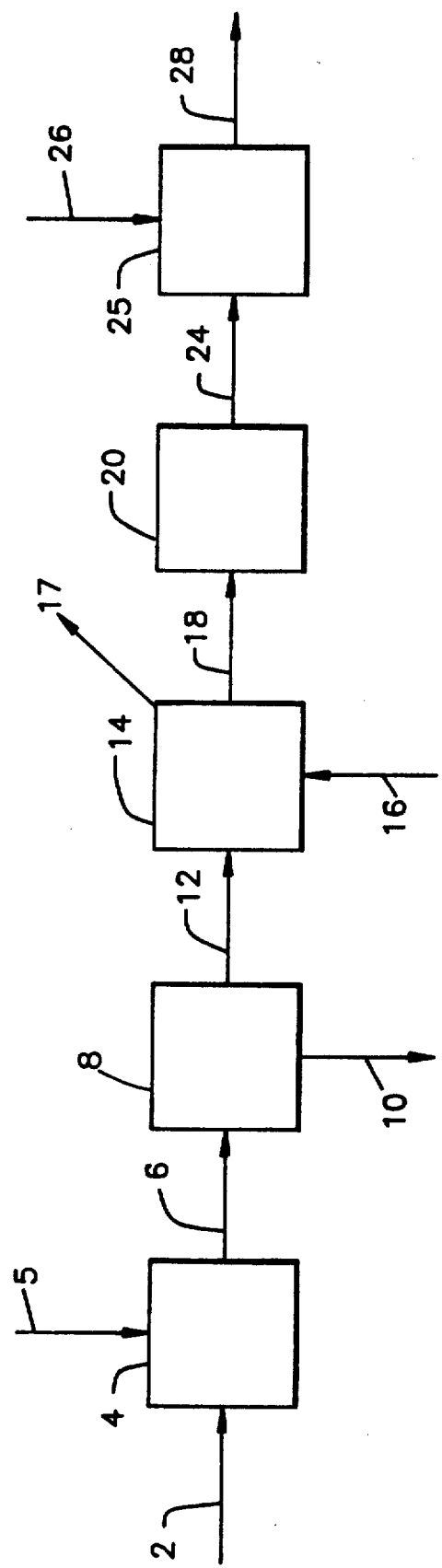
FIG. 1 depicts an overall process flow chart of the present invention.

Referring to FIG. 1, a feed line 2 of wastepaper bales is fed to a pulper 4. In the pulper 4 there is added through a flow line 5 water, surfactant and alkalining agent, to provide an aqueous fiber slurry suspension. At all times the temperature in the pulper is kept below the melting point of the non-ink contaminants, preferably below 28° C. The suspension is then passed through a flow line 6 to a screener 8. The screener 8 operates to remove substantially all of the non-ink contaminants which exit the screener 8 through a flow line 10. The screened slurry then passes through a flow line 12 to a deinker 14. Preferably the deinker 14 comprises a froth flotation apparatus and is operated at a temperature below the melting point of any remaining non-ink contaminants. In the froth flotation apparatus, air is injected through a flow line 16 and the froth containing ink particles and any remaining non-ink contaminants are removed via a flow line 17. The deinked slurry is removed from the deinker 14 through a flow line 18 and passed to a cleaner 20 wherein the fibers are further diluted and filtered to remove any remaining ink particles, non-ink contaminants and ash. The effluent from the cleaner 20 is fed through a flow line 24 to a bleacher 25. A bleaching liquor is added to the slurry through a flow line 26 and the temperature of the slurry is elevated to at least about 60° C. The bleached slurry exits the bleacher 25 through a line 28 to be recovered as a product pulp (not shown).

Figure 2:
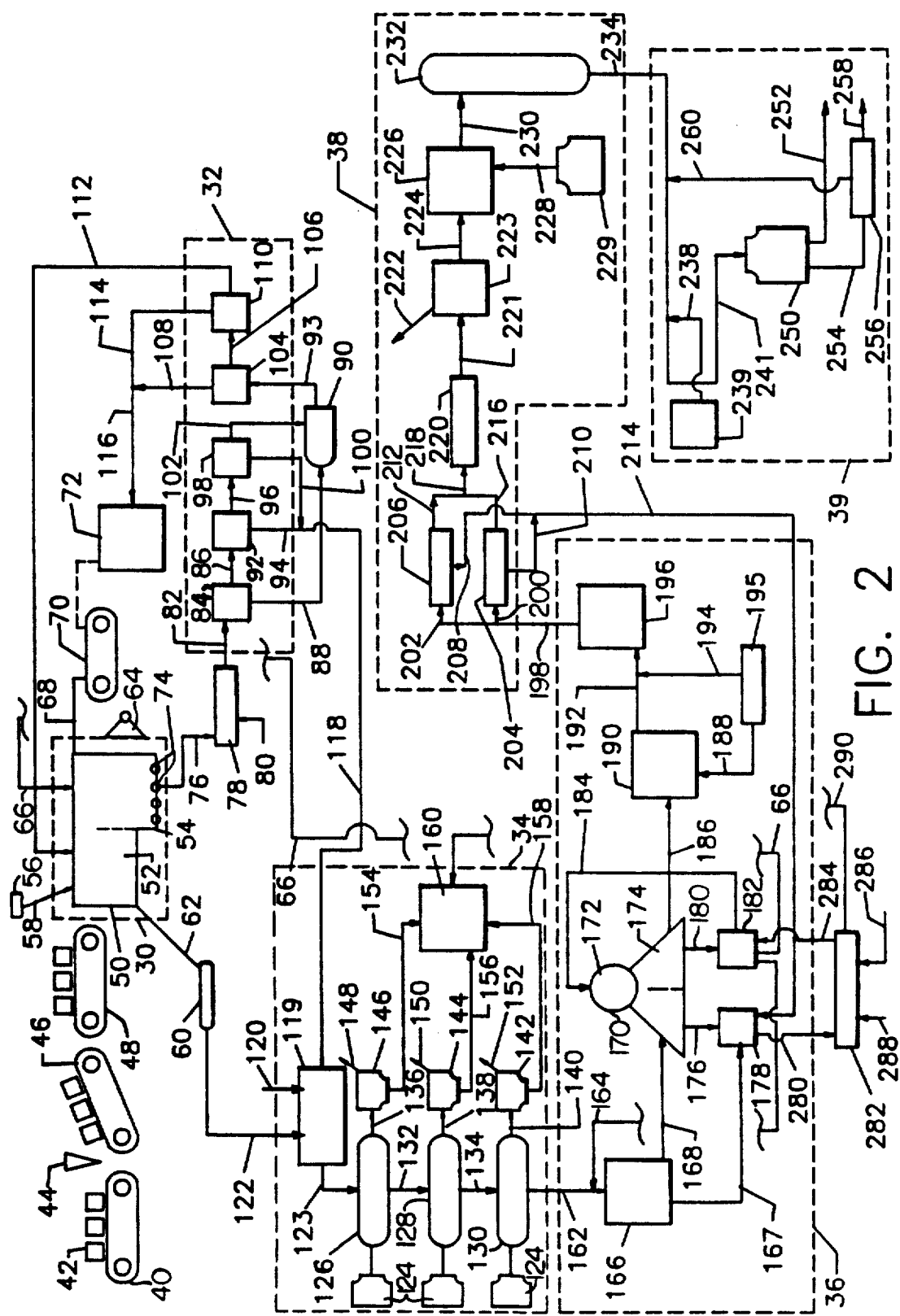
FIG. 2 depicts a detailed process flow chart of a preferred embodiment of the present invention.

In a preferred embodiment, see FIG. 2, bales of wastepaper 42 are loaded onto a bale loading conveyor 40. The bales 42 will pass through a wire cutter 44 which will automatically cut the retaining straps. The bales 42 are then transported along a variable speed pulper feed conveyor 46 to a pulper weight conveyor 48 which preferably monitors system input. The bales 42 are discharged from the pulper weight conveyor 48 into a pulper 50 and enter the pulping stage 30.

The pulper 50 is preferably an Ahlstrom Fiberflow Drum pulper, such as described in, for example, U.S. Pat. No. 4,264,438 (Frejborg), and is driven by motor 64. The bales 42 enter the high consistency zone 52 of the pulper 50 where consistency is preferably controlled at about 20-25 percent by the addition of dilute accepted stock in a flow line 112 from the sand trap cleaners 110 as described hereinbelow.

Caustic from a caustic tank 56 and surfactant from a surfactant tank 60 are added to the high consistency zone 52 through flow lines 58 and 62, respectively, to accelerate defiberization and dispersion.

The caustic can be any compound capable of converting the water to an alkaline pH. The compounds that can be used include among others the hydroxides and silicates of alkali metals such as sodium and potassium or mixtures of these. Sodium hydroxide is particularly preferred. Preferably, the caustic is metered from the caustic tank 56 with a diaphragm pump (not shown) through a flow line 58 to the pulper 50 in an amount sufficient to provide a pulper concentration ranging from about 0.25 to about 2 percent by weight, most preferably about 0.5 percent by weight, based on the weight of the fiber suspension in the pulper 50.

A wide variety of surfactants may be employed in the pulper 50. Most preferred is "BEROCELL" 204 manufactured by Nobel Industries. Preferably the surfactant is metered from a surfactant tank 60 with a diaphragm pump (not shown) through a flow line 62 in an amount sufficient to provide a pulper concentration ranging from about 0.2 to about 1 percent by weight based on the weight of the fiber suspension in the pulper 50. Most preferred is a surfactant concentration of about 0.4 percent by weight.

As the wastepaper is wetted and dropped on the rotating drum surface, the shearing forces created will defiberize the paper without disintegrating contaminants. The rotation of the drum will also create a rubbing action which will loosen ink, size, and hot melts from the fibers.

Essential to the process of the present invention is that the temperature of the fiber suspension in the pulper is maintained below the melt temperature of any non-ink contaminants. Preferably the temperature is maintained below 28° C., most preferably below 25° C., however, the temperature of the fiber suspension depends upon the melting point of the non-ink contaminants present in the suspension. The combination of low temperature and a reduction in the mechanical forces applied to the waste paper in the pulper 50 enhances separation of non-ink contaminants with less size reduction. Consequently a greater proportion of these contaminants are removed in the pulper screening system 32.

Drum rotation and slope will carry the high consistency stock into the low consistency zone 54 of the pulper 50, in which the drum shell is preferably perforated with perforations 74 to provide coarse screening. The stock in the low consistency zone 54 is diluted from about 20 to about 3-5 percent consistency by the addition of recycled clarified white water from a flow line 66 emanating from a clarified white water tank 182 (described hereinbelow).

The action of drum rotation will complete defiberization of the wastepaper into a substantially uniform slurry which passes through the perforations 74 and drops through a flow line 76 into the pulper accepted stock chest 78. Reject material, consisting of wires, plastics and the like, are discharged over the pulper 50 end barrier via a flow line 68 and onto a pulper rejects conveyor 70 which transports the material to the compactor drainer 72.

The pulper accepted stock is then transported from the chest 78 to a screening system 32. Preferably the screening system comprises a conventional Ahlstrom four stage screening system.

The pulper accepted stock in the chest 78 is diluted with recycled white water from a flow line 80 to a consistency of about 3.5 percent and pumped to the screening system 32 via a flow line 82. The stock first enters a trash sorter 84, such as an Ahlstrom Fiberscreen FS6. Accepted stock from the trash sorter 84 is removed via a flow line 86 for fine screening, while rejects flow through a flow line 88 to the tertiary screen/sand trap cleaner supply tank 90.

The accepted stock in a flow line 86 then enters a primary screener 92, typically an Ahlstrom Sorter M800. Accepted stock from the primary screener 92 is removed through a flow line 94 and routed through a flow line 118 to a de-ink cell feed tank 119. Rejected stock from the primary screener 92 is routed via a flow line 96 to a secondary screener 98 which may comprise an Ahlstrom Sorter M200. Accepted stock from the secondary screener 98 is removed via a flow line 100 and combined with accepted stock from the primary screener in a flow line 94 to form a flow line 118 for routing to the de-ink cell feed tank 119.

Rejected stock from the secondary screener 98 is removed through a flow line 102 and fed to the tertiary screen/sand trap cleaner supply tank 90 where it is combined with trash sorter rejects from a flow line 88. A feed line 93 from the supply tank 90 is then directed to a tertiary screener 104, such as an Ahlstrom Selector. Accepted stock from the tertiary screener 104 is routed to a sand trap cleaner 110 through a flow line 106, while rejected stock from the tertiary screener 104 is removed through flow line 108.

The sand trap cleaner 110 preferably comprises a Berg Cleaner RB300/HD. Accepted stock from the sand trap cleaner 110 is removed via a flow line 112 and recycled to the high consistency zone 52 of the pulper 50. Rejected stock from the sand trap cleaner 110 is removed via a flow line 114 and is combined with a flow line 108 to form a flow line 116 which is directed to the compactor-drainer 72.

Accepted stock from the primary screener 92 and the secondary screener 98 are diluted in a de-ink cell feed tank 119 to a consistency ranging from about 1.0 to about 1.5 percent, preferably 1.0 to 1.2 percent, by the addition of clarified white water from a flow line 120. Surfactant from the surfactant tank 60 is also added to the stock in a feed tank 119 through a flow line 122 in an amount ranging from about 0.15% to about 1.0% by weight of the incoming feedstock.

The dilute stock is then deinked in a deinking zone 34 which preferably comprises a froth flotation system such as a Beloit three stage pressurized flotation system utilizing PDM 600 modules. The dilute stock enters the deinking zone 34 via a flow line 123 and is directed to the first stage deinking cell 126 wherein finely dispersed air is injected from an air supply 124. Preferably the air is injected at a pressure ranging from 20 to 40 psig, most preferably about 25 psig.

In the deinking cell 126, ink particles and remaining non-ink contaminants adhere to the air bubbles and rise to the liquid surface creating a floating layer of froth. The froth is discharged from the top of the cell 126 through a flow line 136 and directed to a cyclone 146. Release of the froth to the atmosphere from the pressurized environment causes the froth bubbles to break, thereby permitting separation of the air from the liquid in the cyclone 146. Air is discharged through a line 148 to the atmosphere via a baffled chamber (not shown). The ink bearing liquid is removed from the cyclone 146 in a flow line 154 and directed to the sludge press feed tank 160.

The partially deinked stock from the first stage deinking cell 126 is pumped through a flow line 132 to the second stage deinking cell 128 wherein the flotation process is repeated. The froth is removed from the second stage deinking cell 128 in a flow line 138 and passed to a cyclone 144 wherein air is discharged in a flow line 150 and ink bearing liquid is directed to the sludge press feed tank 150 via a flow line 156. The deinked stock from the second stage deinking cell 128 is fed via a flow line 134 to the third stage deinking cell 130 for final flotation. The froth from the third stage deinking cell 130 is removed through a flow line 140 and fed to a cyclone 142 for separation into an air stream in a flow line 152 and ink bearing liquid in a flow line 158 which in turn is delivered to the sludge press feed tank 160.

Applicant has found that it is advantageous to keep the temperature in the deinking stage 34 at a temperature below the melting point of any non-ink polymeric contaminants, preferably below 28° C., most preferably below 25° C.

The deinked stock is discharged from the third stage deinking cell 132 via a flow line 162 and enters the cleaning stage 36. The deinked stock enters a cleaning system 166. Preferably fine cleaning is accomplished in a conventional four stage Ahlstrom forward cleaning system using modulized Twin Cleaner Model 133 units (not shown). The feed to the cleaning system is diluted to a consistency of from 0.5 to about 0.75 percent, preferably about 0.6 percent with clarified white water from a flow line 164.

Rejects from the cleaning system 166 are removed through a flow line 167 and are directed to the clarifier feed tank 178. Accepted stock from the cleaning system 166 is discharged via a flow line 168 to a filter system. Preferably the filter system comprises a disc filter 170 such as an Ahlstrom IKS 45-20/22 disc filter wherein the stock is thickened to from about 12 to about 20 percent consistency, most preferably about 16 percent. The disc filter 170 provides ash removal as well as removal of substantially all of the remaining ink particles and non-ink contaminants.

In the disc filter 170, it is preferred that a 60/40 cloudy/clear filtrate split is maintained. Cloudy filtrate drops to the cloudy side of the filtrate tank 174 and is pumped via a flow line 176 to the clarifier feed tank 178. Filtrate in the clarifier feed tank 178 is pumped through a flow line 280 to a clarifier system 282, preferably comprising two Permutit OBS-900 clarifiers. The filtrate is treated with a cationic polymer from a flow line 286 and mixed with air from a flow line 288. A wide variety of cationic polymers may be employed, preferred is "KLAR-AID" 2400 from W. R. Grace & Co. The air bubbles will carry suspended material to the liquid surface forming a froth layer which will be skimmed off via a flow line 290 for pumping to the sludge press feed tank 160. Clarified water is pumped via a flow line 284 to the clarified white water tank 182. Clear filtrate drops to the clear side and is pumped via a flow line 180 to the clarified white water tank 182. Clarified white water is pumped from the clarified white water tank 182 via a flow line 184 to the disc filter shower 172.

The disc filter stock discharge is directed through a flow line 186 to a filter repulper 190 wherein it is diluted to from about 10 to about 7 percent consistency, preferably 8 percent, with heated fresh water from a flow line 188. The discharge from the filter repulper 190 is removed in a flow line 192 and is diluted to from about 6 to about 4 percent, preferably 5 percent, with a 25/75 bleaching stage white water heated fresh water mixture from a flow line 194. The diluted stock then passes into a retention tank 196. Fresh water added to the process is heated to 30° C. in a tank 195 such as with a shell/tube heat exchanger.

Diluted stock from the retention tank 196 is discharged via a flow line 198 and enters the bleaching stage 38. The stock in the flow line 198 is split into two flow lines 200 and 202 which are directed to two presses 204 and 206 respectively. Preferably the presses are screw presses, such as two Hymac 45 SL models. The presses provide additional ash removal and thickening prior to bleaching. The press effluent is directed through two flow lines 210 and 208 respectively, which combine to form a flow line 214 for discharge to the clarifier feed tank 178.

High consistency stock from the presses 204 and 206 is removed via flow lines 216 and 212, respectively, which are combined into a flow line 218 for feed to a conveyor 220, such a screw conveyor. The thickened stock is then directed through a flow line 221 to a steam mixer 223, preferably an Impco Series 400 single shaft steam mixer. Steam, preferably at about 30 psig, is added, via a flow line 222, to increase the stock temperature to about 60° C.

The steam mixer 223 discharges via a flow line 224 to a second mixer 226, such as an Impco Series 600 Hi-shear mixer. A peroxide bleaching liquor in a tank 229 is fed to a mixer 226 through a flow line 228. A wide variety of bleaching liquors, known to those skilled in the art may be employed. The preferred bleaching liquor comprises a mixture of hydrogen peroxide, sodium silicate and caustic, and is added to the second mixer 226 at an application rate of about 2 percent peroxide on pulp. The treated stock discharges from the second mixer 226 through a flow line 230 to a bleaching tower 232 such as a Kamyr downflow high density tower.

Preferably the bleaching tower provides from about 1.5 to about two hours retention and the bleaching consistency is about 20 percent.

Stock in the tower bottom dilution zone is withdrawn in a flow line 234 and enters the recovery zone 39. The stock is diluted to from about 5.0 to about 2.5 percent consistency, preferably about 3.5 percent consistency, with effluent from the wetlap machine 256 through a flow line 260. The diluted stock is then treated with sulfur dioxide or sulfuric acid, via a flow line 238 to neutralize residual hydrogen peroxide and adjust pH, preferably to about 7.0.

In a preferred method of operation, liquid sulfur dioxide is received and retained in a sulfur dioxide storage tank 239 equipped with an air compressor, air filter, cooler and air dryer system (not shown) to maintain a pressure of from about 7-80 psig. The pressurized liquid sulfur dioxide flows to a vaporizer and sparger system (not shown) and is mixed with water to form sulfurous acid for injection via a flow line 238.

The neutralized stock in a flow line 241 is then pumped to high density storage for distribution either to a papermill via a line 252 and/or through a flow line 254 to a wet lap machine 256, such as a Fields & Boyd WT/PP twin wire press, for market distribution via a flow line 258. Preferably the recovered stock comprises fibers having a brightness of about 80° ISO.

It is also contemplated that one or more complexing or chelating agents can be introduced into the present process, preferably in the pulping 30, deinking 34 and/or bleaching 38 stages. Various types of such agents can be used for this purpose and are available commercially. Most preferred is diethylenetriamine-pentaacetate which is available commercially as "HAMP-EX" 80 from W. R. Grace & Co.

The above mentioned patents are hereby incorporated by reference.

Many variations of the present invention will suggest themselves to those skilled in the art in light of the above-detailed description. All such obvious modifications are within the full intended scope of the claims.

I claim:

1. A process for treating wastepaper consisting essentially of:
   (a) pulping said wastepaper in an aqueous suspension in the presence of a caustic and a surfactant at a temperature below the melting point of non-ink contaminants present in the wastepaper to form a fiber slurry having a consistency of less than about 15 percent and to release substantially all non-ink contaminants from the wastepaper fibers;
   (b) screening the effluent from the pulping stage to separate substantially all of said non-ink contaminants from said wastepaper fibers;
   (c) after separating non-ink contaminants from said wastepaper fibers by screening, deinking said wastepaper fibers by froth flotation at a temperature of less than about 28° C.;
   (d) cleaning the deinked fibers by dilution and filtration to substantially remove remaining ink particles and ash;
   (e) bleaching the washed fibers from step (d) in a bleaching liquor at a temperature of at least about 60° C. for about 1.5 to about 2 hours; and
   (f) recovering the bleached fibers from step (e); wherein said recovering fibers are substantially free from non-ink contaminants and ink particles and have a brightness of at least about 80° ISO.

2. A process as defined in claim 1 wherein the pulping temperature of step (a) is below 28° C.

3. A process as defined in claim 2 wherein said pulping temperature is below about 25° C.

4. A process as defined in claim 1 wherein the caustic in said pulping step (a) comprises sodium hydroxide and is present in an amount of from about 0.25 to about 2 percent by weight based on the weight of the suspension.

5. A process as defined in claim 1 wherein the surfactant in said pulping stage (a) comprises a nonionic dispersant-collector and is present in an amount ranging from about 0.2 to about 1 weight percent based on the weight of the suspension.

6. A process as defined in claim 1 wherein said pulping stage (a) comprises pulping said aqueous suspension in a rotating drum.

7. A process as defined in claim 6 wherein said rotating drum comprises two zones of fiber slurry consistency, an upstream zone having a consistency ranging from about 10 percent to about 20 percent and a downstream zone having a consistency of from about 3 to about 5 percent.

8. A process as defined in claim 1 wherein in step (b) the effluent is further diluted to a consistency ranging from about 1 to about 1.2 percent.

9. A process as defined in claim 8 wherein said screening step (b) comprises four stages of screening, each said successive stage comprising a finer screen.

10. A process as defined in claim 1 wherein said deinking step (c) comprises a froth flotation stage in which the flow of slurry and air to a mixing zone are independently controlled; the air is introduced into the slurry while the quantity and size of the air bubbles are controlled, the air and the slurry are mixed with said mixing being controlled independently and apart from introducing the air into the slurry to bring the air bubbles into contact with the ink; and the ink-laden air bubbles are separated from the fiber slurry.

11. A process as defined in claim 10 wherein said air is introduced into the slurry at a pressure of about 25 psig.

12. A process as defined in claim 11 wherein said deinking step (c) comprises at least three serially connected froth flotation stages.

13. A process as defined in claim 1 wherein said cleaning step (d) is carried out at a consistency ranging from about 0.4 to about 0.8 percent.

14. A process as defined in claim 1 wherein said bleaching liquor of step (e) comprises hydrogen peroxide, sodium silicate and sodium hydroxide.

15. A process as defined in claim 14 wherein said bleaching step (e) is carried out at a consistency ranging from about 25 to about 35 percent.

16. A process as defined in claim 1 wherein said recovery step (f) comprises diluting the bleached fibers to about 3.5 percent consistency.

17. A process as defined in claim 16 wherein said recovery step (f) further comprises treating said bleached fibers with sulfur dioxide and diethylenetriamine pentaacetate.

18. A process as defined in claim 17 wherein said recovery step (f) further comprises a wet-lapping stage.

19. A process for treating wastepaper consisting of:
   (a) pulping said wastepaper in an aqueous suspension in the presence of a caustic and a surfactant at a temperature below the melting point of non-ink contaminants present in the wastepaper to form a fiber slurry having a consistency of less than about 15 percent and to release substantially all non-ink contaminants from the wastepaper fibers;
   (b) screening the effluent from the pulping stage to separate substantially all of said non-ink contaminants from said wastepaper fibers;
   (c) after separating non-ink contaminants from said wastepaper fibers by screening, deinking said wastepaper fibers by froth flotation at a temperature of less than about 28° C.;
   (d) cleaning the deinked fibers by dilution and filtration to substantially remove remaining ink particles and ash;
   (e) bleaching the washed fibers from step (d) in a bleaching liquor at a temperature of at least about 60° C. for about 1.5 to about 2 hours; and
   (f) recovering the bleached fibers from step (e); wherein said recovered fibers are substantially free from non-ink contaminants and ink particles and have a brightness of at least about 80° ISO.

20. A process for treating wastepaper consisting essentially of:
   (a) pulping said wastepaper in an aqueous suspension in the presence of a caustic and a surfactant at a temperature below the melting point of polymeric non-ink contaminants present in the wastepaper to form a fiber slurry having a consistency of less than about 15 percent and to release substantially all polymeric non-ink contaminants from the wastepaper fibers;
   (b) screening the effluent from the pulping stage to separate substantially all of said polymeric non-ink contaminants from said wastepaper fibers;
   (c) after separating polymeric non-ink contaminants from said wastepaper fibers by screening, deinking said wastepaper fibers by froth flotation at a temperature of less than about 28° C.;
   (d) cleaning the deinked fibers by dilution and filtration to substantially remove remaining ink particles and ash;
   (e) bleaching the washed fibers from step (d) in a bleaching liquor at a temperature of at least about 60° C. for about 1.5 to about 2 hours; and
   (f) recovering the bleached fibers from step (e); wherein said recovered fibers are substantially free from non-ink contaminants and ink particles and have a brightness of at least about 80° ISO.

21. A process as defined in claim 20 wherein said polymeric non-ink contaminants comprise glues and adhesives.

* * * * *